US008713621B2

(12) United States Patent
White

(10) Patent No.: US 8,713,621 B2
(45) Date of Patent: Apr. 29, 2014

(54) SYSTEM AND METHOD OF ERROR REPORTING IN A VIDEO DISTRIBUTION NETWORK

(75) Inventor: Scott White, Austin, TX (US)

(73) Assignee: AT&T Intellecutal Property I, L.P., Atlanta, GA (US)

( * ) Notice: Subject to any disclaimer, the term of this patent is extended or adjusted under 35 U.S.C. 154(b) by 1065 days.

(21) Appl. No.: 11/588,836

(22) Filed: Oct. 27, 2006

(65) Prior Publication Data

US 2008/0104454 A1 May 1, 2008

(51) Int. Cl.
*H04N 7/173* (2011.01)
*G06F 11/00* (2006.01)

(52) U.S. Cl.
USPC ................................ 725/107; 714/27; 714/47

(58) Field of Classification Search
USPC .......................................................... 725/107
See application file for complete search history.

(56) References Cited

U.S. PATENT DOCUMENTS 5,818,440 A * 10/1998 Allibhoy et al. .............. 715/718
5,984,178 A * 11/1999 Gill et al. ...................... 235/379
6,983,362 B1 1/2006 Kidder et al.
7,036,052 B2 4/2006 Pierce et al.
7,444,551 B1 * 10/2008 Johnson et al. ................. 714/43
7,610,296 B2 * 10/2009 Hughes et al. ........................ 1/1
7,634,797 B2 * 12/2009 Yun .............................. 725/107
2006/0030316 A1 * 2/2006 Lando ........................ 455/432.3
2006/0253760 A1 * 11/2006 Jones ............................ 714/741
2007/0058043 A1 * 3/2007 Thukral ........................ 348/180
2008/0005281 A1 * 1/2008 Hsueh et al. .................. 709/219
2008/0046786 A1 * 2/2008 Patel et al. .................... 714/100
2008/0066128 A1 * 3/2008 Yun .............................. 725/107
2008/0069002 A1 * 3/2008 Savoor et al. ................. 370/241
2008/0320338 A1 * 12/2008 Ward ............................. 714/43

OTHER PUBLICATIONS

Tony Northrup, "Using Microsoft Online Crash Analysis," Oct. 6, 2003, pp. 1-4.
Microsoft, "Microsoft Online Crash Analysis" 2006 https://oca.microsoft.com/en/welcome.aspx.

* cited by examiner

*Primary Examiner* — Nasser Goodarzi
*Assistant Examiner* — Fred Peng
(74) *Attorney, Agent, or Firm* — Toler Law Group, PC

(57) ABSTRACT

Method, systems and devices for error reporting in a video distribution network are disclosed. A method may include determining that a network communication error has occurred in a video distribution network. The method may also include sending an error reporting interface to a video display. The method may also include receiving a send error report selection via the error reporting interface. In response to receiving the send error report selection, the method may perform at least one action.

14 Claims, 9 Drawing Sheets

Super Hub Office 104
Content Server 102
Internet 106
100
Video Hub Office 110
Network 112
108
Display 120
User 122
STB 118

SYSTEM AND METHOD OF ERROR REPORTING IN A VIDEO DISTRIBUTION NETWORK

FIELD OF THE DISCLOSURE

The present disclosure is generally related to network communications.

BACKGROUND

In a video distribution network, video content is typically sent via a network to a display. For example, video content may be delivered from a source, for example a super hub office, to set-top boxes in viewers' homes. Occasionally, the video distribution network may experience a communication error. Such network communication errors can have a negative impact on user satisfaction with a service provider. Hence, there is a need for an improved system and method of error handling in a video distribution network.

DETAILED DESCRIPTION OF THE DRAWINGS

A video device is disclosed that includes a network interface to communicate with a video distribution network. The video device also includes an error report module to send an error report to a remote network device when a network communication error is detected. The video device may also include a user interface module to send a user interface including a send error report option to a video display and to receive a user selection of the send error report option.

A method of error reporting in a video distribution network is also disclosed. The method includes determining that a network communication error has occurred in a video distribution network. The method may also include sending an error report interface to a video display device. The method may also include receiving a send error report selection and performing at least one action in response to receiving the send error report selection.

A method of error reporting in a video distribution network is disclosed that includes receiving at least one first automatically sent error report. The at least one first automatically sent error report may be associated with at least one first network communication error. The method also includes receiving at least one second automatically sent error report. The at least one second automatically sent error report may be associated with at least one second network communication error. The method may also include receiving at least one first user initiated error report. The at least one first user initiated error report may be associated with the at least one first network communication error. The method also includes prioritizing the at least one first network communication error and the at least one second network communication error based on the at least one first automatically sent error report, the at least one second automatically sent error report, and the at least one first user initiated error report.

Figure 1:
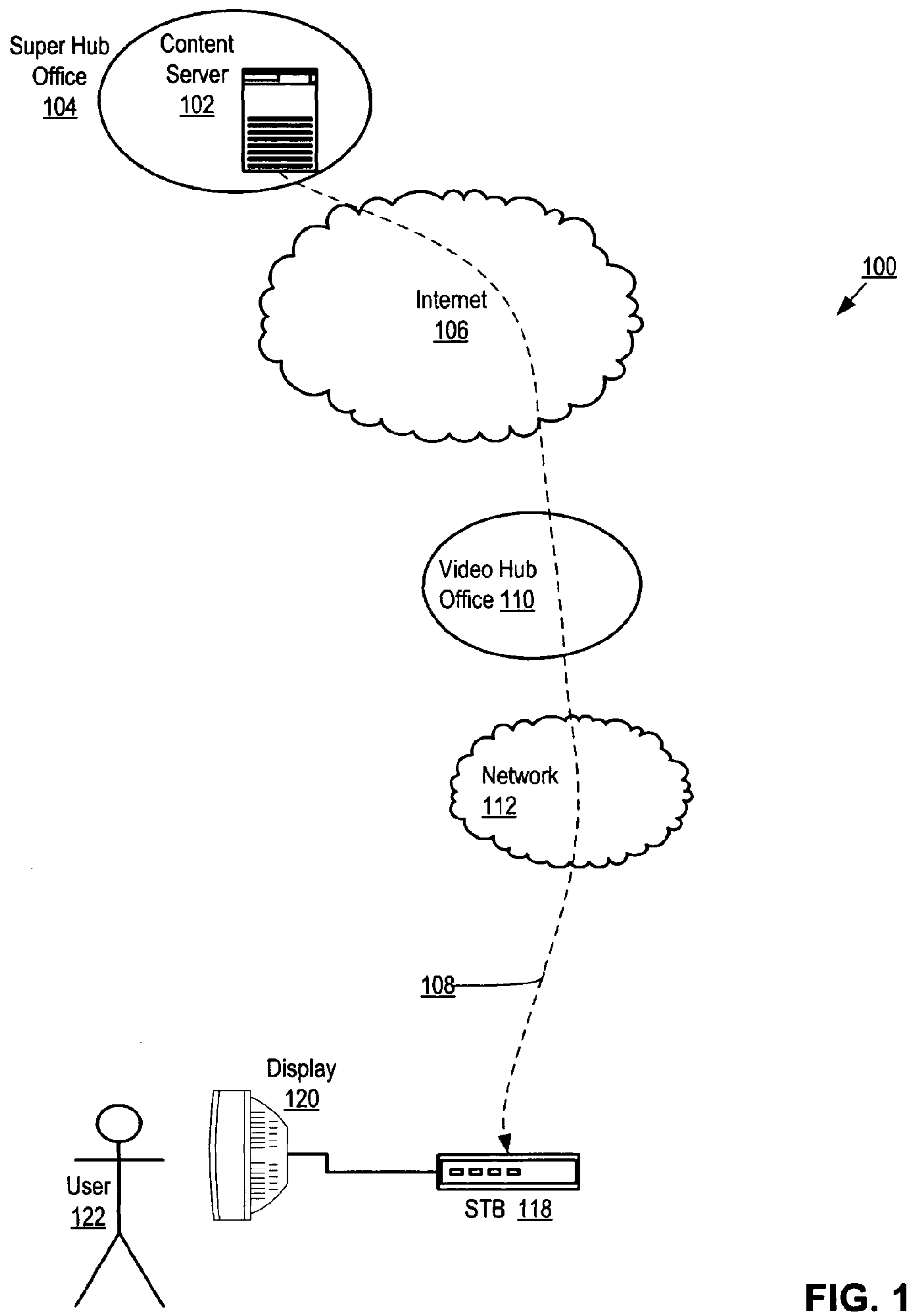
FIG. 1 is a block diagram of an embodiment of a video distribution network.

Referring now to FIG. 1, a particular illustrative embodiment of a video distribution network 100 is shown. The video distribution network 100 includes a content server 102 at a super hub office 104. In general, a server may include a computing device adapted to execute software applications. Such software applications may include, for example, communication functions, data processing functions, security functions, such as authentication and authorization functions, other functions, or any combination thereof. As used herein, the term "server" is used broadly to refers to a hardware device or software application providing services to another hardware device or software application. The term "server" is not intended to be limited to a single, dedicated hardware device. Rather, a server may include a plurality of hardware devices or software applications operating in parallel or in series to provide the services. Additionally, a server may include or be coupled to a controller, for example, a load-balancer, to control the provision of services.

The content server 102 communicates with a display 120 via a communications path 108. The communications path 108 may pass through one or more networks, such as, for example, internet 106 or a local network 112. The video distribution network 100 may also pass through a video hub office 110. In a particular embodiment, the local network 112 may be a private access network of an internet protocol television (IPTV) network. The video distribution network 100 may also include a customer premises device, such as set top box (STB) 118. The STB 118 may communicate with one or more displays 120 of a user 122.

Figure 6:
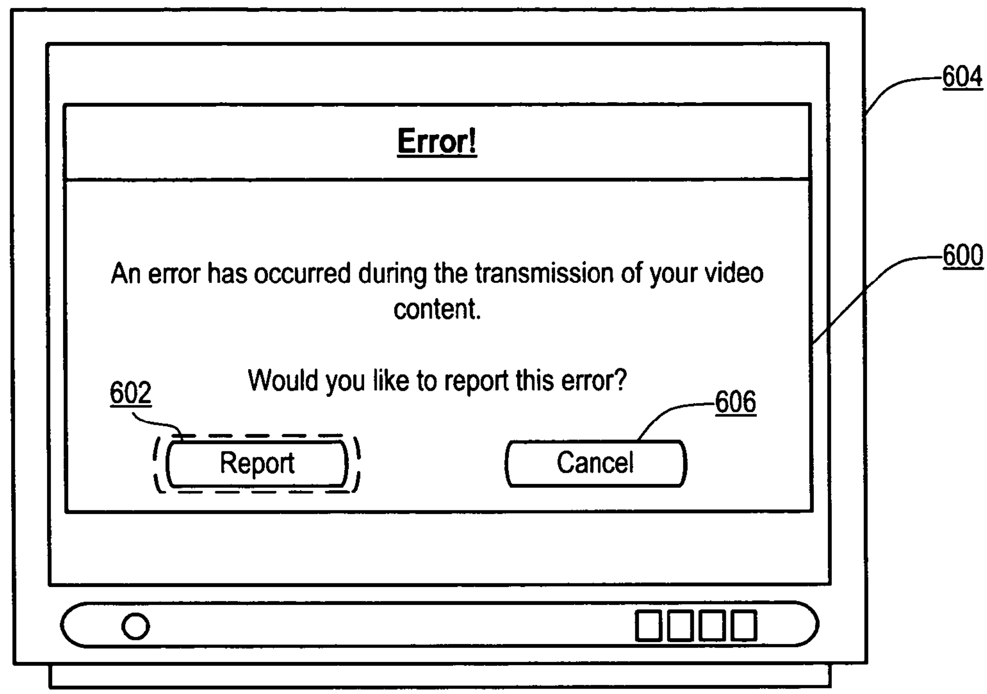
FIG. 6 is an illustration of a first exemplary embodiment of a graphical user interface to report errors in a video distribution network.

While communicating video content from the content server 102 to the display 120, one or more devices of the video content distribution system may undergo a communication error. In a particular embodiment, the video distribution network 100 may be adapted to report network communication errors. In an illustrative embodiment, the video distribution network 100 may report network communication errors in response to a user command. For example, after determining that a network communication error has occurred in the video distribution network 100, an error reporting interface may be displayed at the display 120 by the STB 118. The STB 118 may receive a send error report selection from the user 122. For example, the user may select an indicator of a send error report option displayed on display 120, by using a remote control to communicate with the STB 118 via the error reporting interface. An example of an error reporting interface is illustrated in FIG. 6. In response to receiving the selection, the STB 118 may perform at least one action, such as closing the send error report selection option window, sending an error report via the video distribution network, sending a notice via the video distribution network that the user has selected the send error report option, presenting a receive notice of correction option on video display 120, other actions, or any combination thereof.

Figure 2:
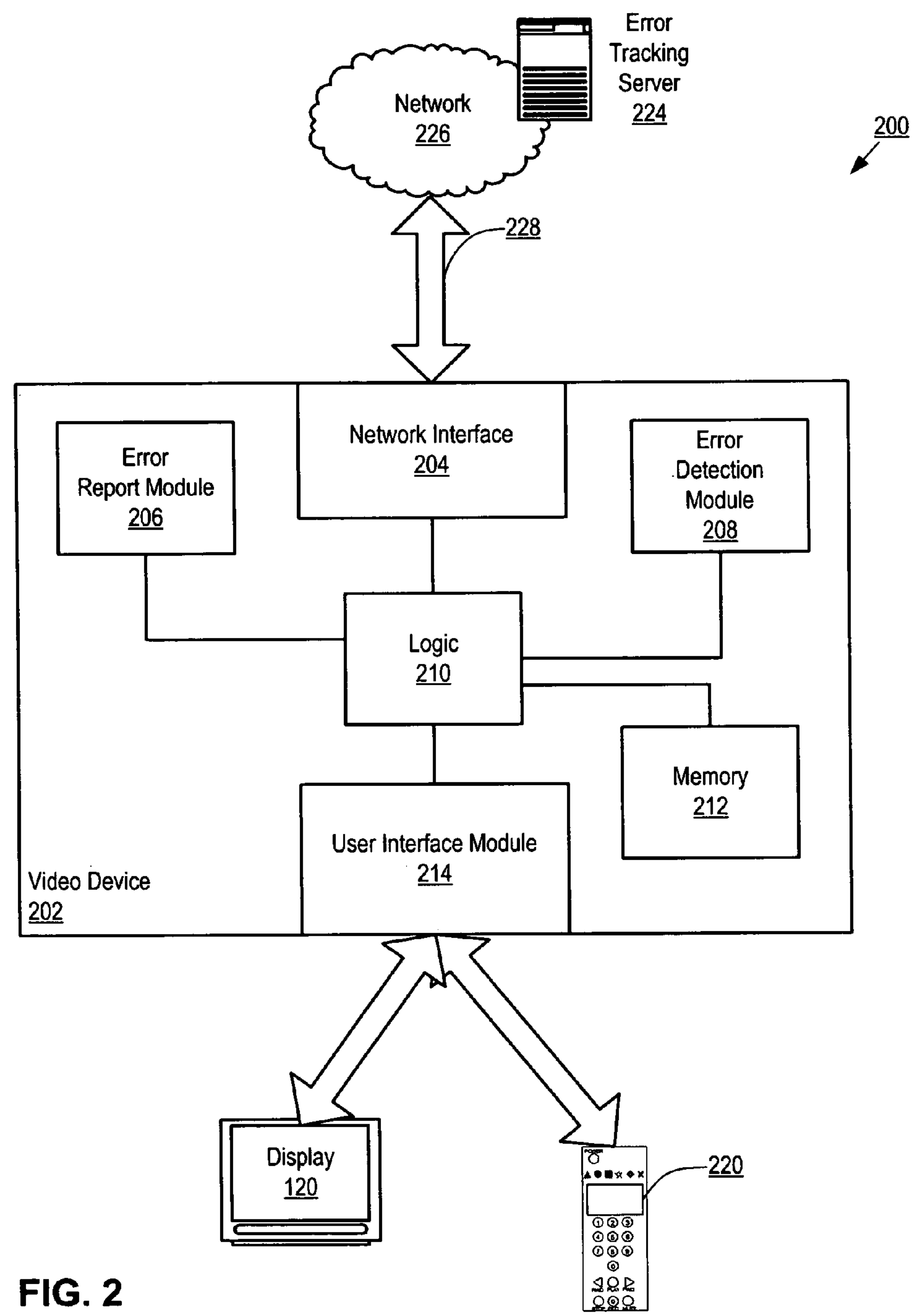
FIG. 2 is a block diagram of a second embodiment of a video distribution network.

FIG. 2 depicts a particular embodiment of a system to report errors in a video distribution network. The system 200 includes a video device 202 in communication with a network 226. The network 226 may include an error tracking server 224. The system 200 also includes a display 120 and a remote control device 220 in communication with the video device 202.

In a particular embodiment, the video device 202 may include a network interface 204, an error report module 206, an error detection module 208, logic 210, and a user interface module 214. The video device 202 may also include other modules or components to provide other functions provided by the video device. Additionally, the modules may be implemented in hardware or software stored in a memory 212 of the video device and executable by the logic 210. For example, the network interface 204, the error report module 206, the error detection module 208, and/or the user interface module 214 may include program instructions of one or more application programs executable by the logic 210.

In a particular embodiment, the network interface 204 is configured to communicate with a video distribution network, such as the network 226. The network interface 204 may receive a data stream 228 that includes video content from the network 226. The network interface 204 may communicate data from the data stream 228 to the logic 210 for processing. The logic 210 may process the video content data and communicate the video content data to the user interface module 214.

In a particular embodiment, the error detection module 208 may be configured to detect when a network communication error has occurred. For example, the error detection module 208 may determine when the network interface 204 has lost communications with one or more devices on the network 226. Upon detecting a network communication error, the error detection module 208 may report the network communication error to the logic 210. The logic 210 may initiate the error report module 206 in response to the error detection module 208 detecting that a network communication error has occurred.

In a particular embodiment, the error report module 206 may generate an error report after a network communication error is detected. The error report module 206 may communicate the error report to the logic 210. The logic 210 may instruct the user interface module 214 to display an error reporting interface at the display 120. The user interface module 214 may display the error reporting interface at the display 120 and receive a user selection of an indicator of a send error report option. In response to viewing the error report, a user may interact with the video device 202 using the remote control device 220 to send one or more commands to the user interface module 214.

In an illustrative embodiment, in response to receiving a user selection of the send error report option, the video device 202 may take at least one action. For example, the video device 202 may: end the display of the error reporting interface, send an error report to the error tracking server 224 via the network 226, send a notice of the user selection of the send error report option to the error tracking server 224, send a request for a notice of correction to the error tracking server 224, take some other action, or any combination thereof.

In a particular embodiment, the video device 202 may automatically send a network communication error report when a network communication error is detected. For example, the error report module 206 may be configured to automatically generate and send a network communication error report to the error tracking server 224 after the error detection module 206 detects that a network communication error has occurred. In an illustrative embodiment, the video device 202 may also send a user initiated error report upon receipt of a send error report option selection from a user. In a particular illustrative embodiment, the user initiated error report may include the same contents as the automatic generated and sent error report. In another particular illustrative embodiment, the user initiated error report may include additional information acquired from the user, such as the context surrounding the detection of the network communication error. In another particular illustrative embodiment, the user initiated network communication error report may include an indication that the user has selected the send error report option. In this embodiment, the user initiated network communication error report may not include details about the network communication error. For example, the user initiated network communication error report may include an indication that the user requested that a network communication error report be sent.

Figure 3:
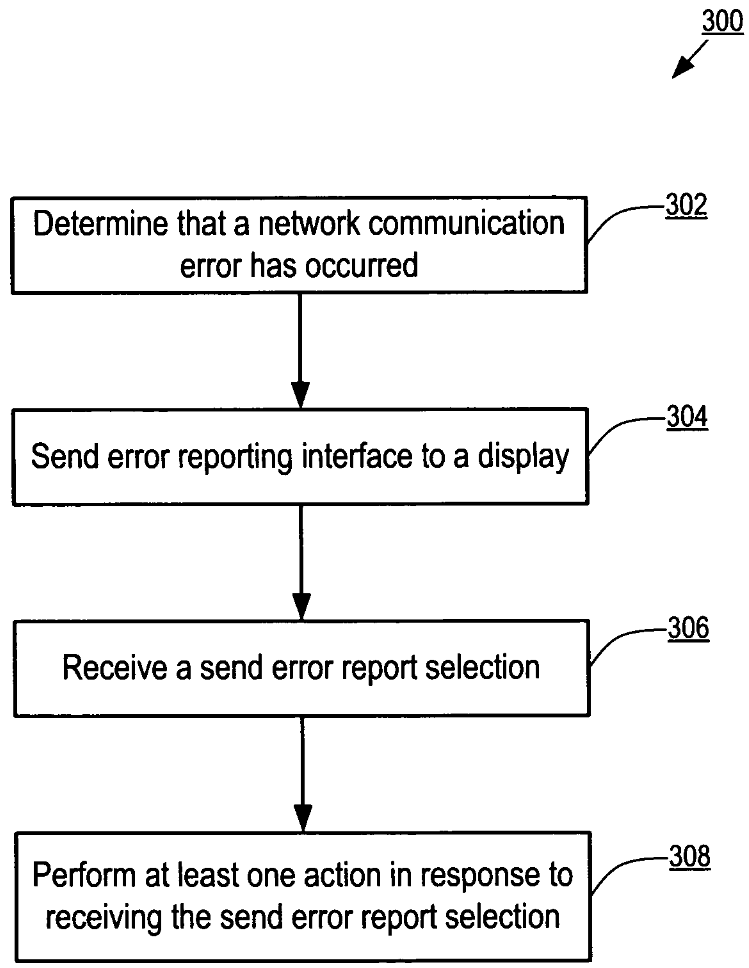
FIG. 3 is a flow chart of a first exemplary embodiment of a method of error reporting in a video distribution network.

FIG. 3 is a flow chart depicting a first exemplary embodiment of a method of error reporting in a video distribution network. The method 300 includes determining that a network communication error has occurred, at block 302. The method also includes sending an error reporting interface to a display, at block 304. For example, the error reporting interface may be displayed to a user on a television display. At block 306, the method includes receiving a send error report selection. The method also includes performing at least one action in response to receiving a send error report selection, at block 308.

Figure 4:
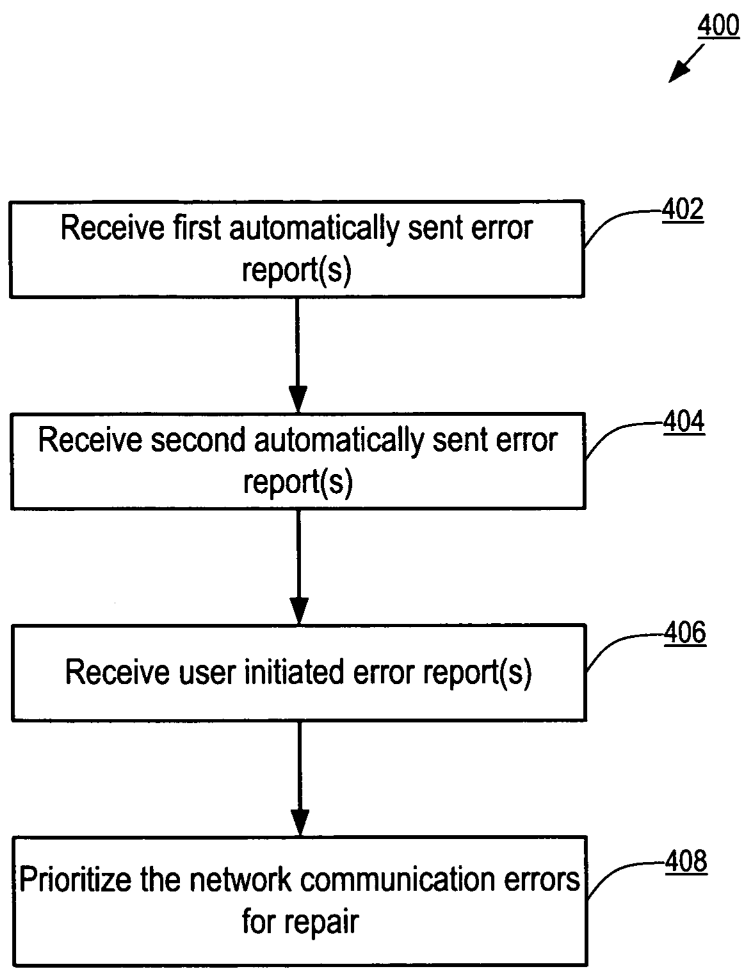
FIG. 4 is a flow chart of a second exemplary embodiment of a method of error reporting in a video distribution network.

FIG. 4 is a flow chart depicting a second exemplary embodiment of a method 400 of error reporting in a video distribution network. The method 400 includes receiving at least one first automatically sent error report, at block 402. The at least one first automatically sent error report may be associated with at least one first network communication error. The method 400 also includes receiving at least one second automatically sent error report, at block 404. The at least one second automatically sent error report may be associated with at least one second network communication error.

The method 400 also includes receiving at least one user initiated error report, at block 406. The at least one user initiated error report may also be associated with the at least one first network communication error. The method 400 also includes prioritizing the at least one first network communication error and at least one second network communication error for repair, at block 408. For example, the at least one first network communication error and the at least one second network communication error may be prioritized for repair based on the at least one first automatically sent error report, the at least one second automatically sent error report, the at least one user initiated error report, or any combination thereof. In an illustrative embodiment, the at least one first network communication error may be assigned a higher priority in response to receiving the at least one user initiated error report.

In a particular embodiment, the at least one user initiated error report may include a plurality of user initiated error reports from a plurality of users. In this embodiment, the at least one first network communication error and the at least one second network communication error may be prioritized for repair based on an aggregation of the plurality of user initiated error reports. In an illustrative embodiment, the network communication errors detected in a video content distribution system may be prioritized for repair based at least in part on the number of users reporting or attempting to report each error.

In another particular illustrative embodiment, the network communication errors detected in a video distribution network may be prioritized for repair based at least in part on both the number of users reporting or attempting to report each error and the number of automatically sent reports. For example, communication errors perceived by users as most urgent and more commonly occurring communication errors to be prioritized higher than other communication errors. In a particular illustrative embodiment, the network communication problem that has generated the most total error reports, including automatically sent error reports and user initiated error reports, may be prioritized highest for repair. In another particular illustrative embodiment, a different weighting may be applied to user initiated error reports than to automatically sent error reports. For example, user initiated error reports may be given a higher weight in prioritizing network communication problems for repair.

Figure 5:
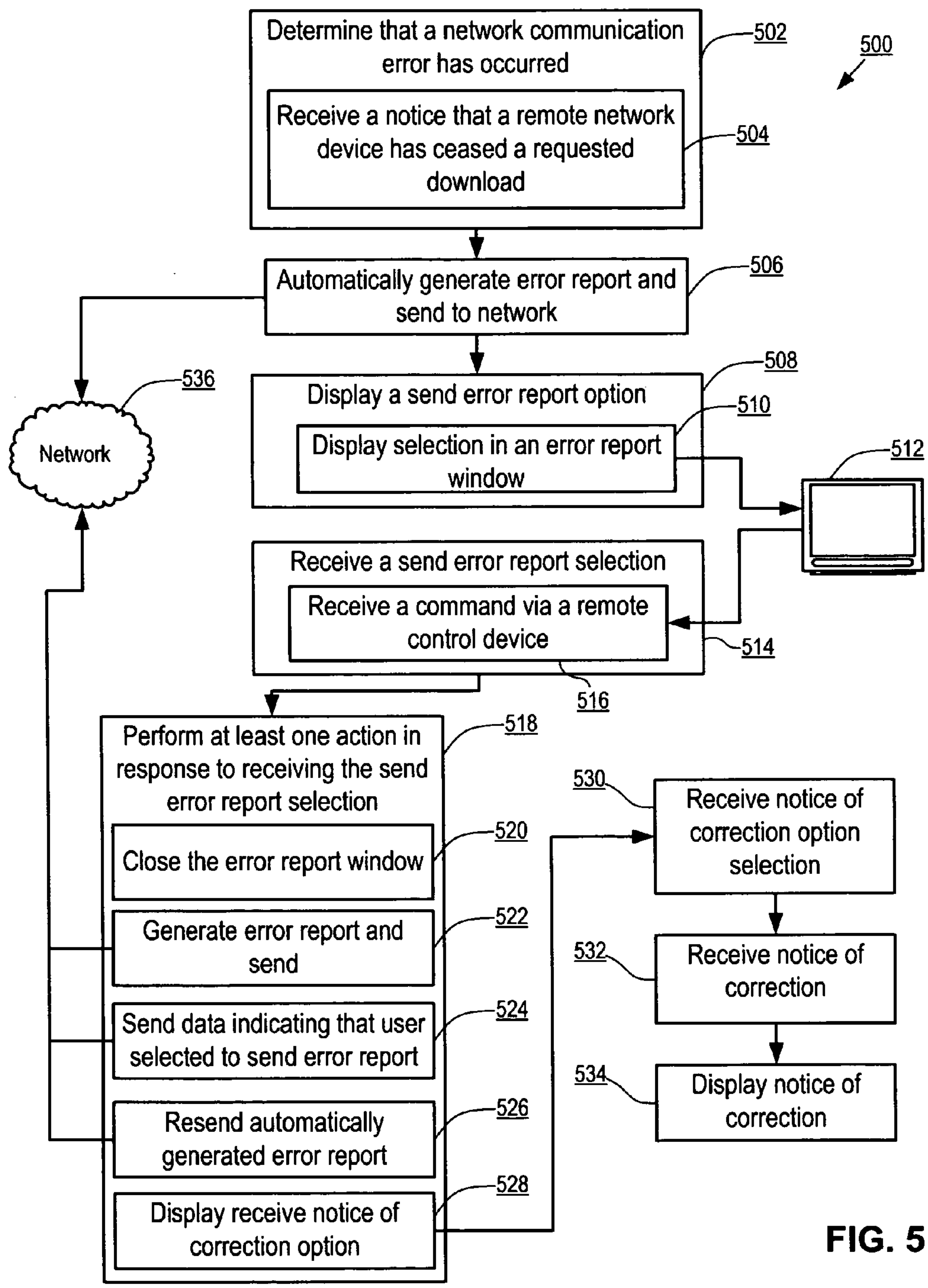
FIG. 5 is a flow chart of a third exemplary embodiment of a method of error reporting in a video distribution network.

FIG. 5 is a flow chart depicting a third exemplary embodiment of a method of error reporting in a video distribution network. The method 500 includes determining that a network communication error has occurred, at block 502. In a particular embodiment, determining that a network communication error has occurred may include receiving a notice that a remote network device has ceased a requested download, at block 504. For example, if a user requests access to video content, a remote network device may determine whether the user is authorized to access the requested video content. If the remote network device determines that the user is not authorized to access the requested video content, the remote network device may issue a notice that the download of the requested video content has been terminated.

In a particular embodiment, the method 500 may also include automatically generating an error report and sending the error report to a remote network device in response to determining that the network communication error has occurred, at block 506. For example, the automatically generated error report may be sent to an error tracking server via a video distribution network 536. The error tracking server may keep a record of error reports. In a particular embodiment, the record of error reports may distinguish between error reports that are automatically initiated, and error reports that are user initiated. In an illustrative embodiment, the record of error reports may be used to prioritize network communication problems for repair.

In a particular embodiment, at block 508, the method 500 may also include displaying an error reporting interface at a video display 512. The video display 512 may be in communication with the video distribution network 536. In an illustrative embodiment, the error reporting interface may include a selectable option in an error report window, at block 510.

In a particular embodiment, the method 500 may also include receiving a send error report selection, at block 514. In a particular illustrative embodiment, the send error report selection may include a command received from a user via a remote control device, at block 516.

The method 500 may also include performing at least one action in response to receiving the send error report selection, at block 518. In an illustrative embodiment, the at least one action may include closing the error report window, at block 520. In another illustrative embodiment, the at least one action may include generating an error report and sending the error report to a remote network device, at block 522. In another illustrative embodiment, the at least one action may include sending data to a remote network device indicating that the user has selected the send error report selection, at block 524. In another illustrative embodiment, the method may include automatically generating and sending an error report, as discussed with reference to block 506, and the at least one action may include re-sending the automatically generated and sent error report, at block 526. In another illustrative embodiment, the at least one action does not include sending an error report to the video distribution network. In another illustrative embodiment, the at least one action may include displaying a receive notice of correction option, at block 528. In another illustrative embodiment, the at least one action may include a combination of one or more actions discussed above, or other actions.

In a particular embodiment where the at least one action includes displaying a receive notice of correction option, at block 528, the method 500 may also include receiving a selection of a notice of correction option, at block 530. In response to receiving the selection, the network 536 may send a notice when the network communication error has been corrected. For example, the receive notice of the correction option selection may be received by a STB in communication with the display 512. The STB may communicate the selection to a remote network device via network 536. The remote network device may store a record of the notice of correction selection, and generate a notice of correction after the network communication error has been corrected. In a particular embodiment, the method 500 may include receiving the notice of correction at block 532, and displaying the notice of correction, at block 534.

In a particular embodiment, the steps of the methods described herein may be executed in the order shown by the figures. In alternative embodiments, the steps may be executed in alternative sequences.

FIG. 6 depicts a first illustrative embodiment of a graphical user interface 600 to report errors in a video distribution network. The graphical user interface 600 may include, for example, a display window or screen presented on a television 604. The graphical user interface 600 may also include a do not send error report option 606. In a particular embodiment, a send error report option 602 may be accompanied by an explanation of the error. For example, the graphical user interface 600 includes an explanation stating that "An error has occurred during transmission of your video content." In an exemplary embodiment, dotted lines surrounding send error report option 602 may indicate that the send error report option 602 has been selected. In response to selection of the send error report option 602, a send error report option selection may be generated. For example, referring briefly to FIG. 2, the user interface module 214 of the video device 202 may generate a send error report selection and communicate the send error report selection to the logic 210 in response to selection of the send error report option 602.

Figure 7:
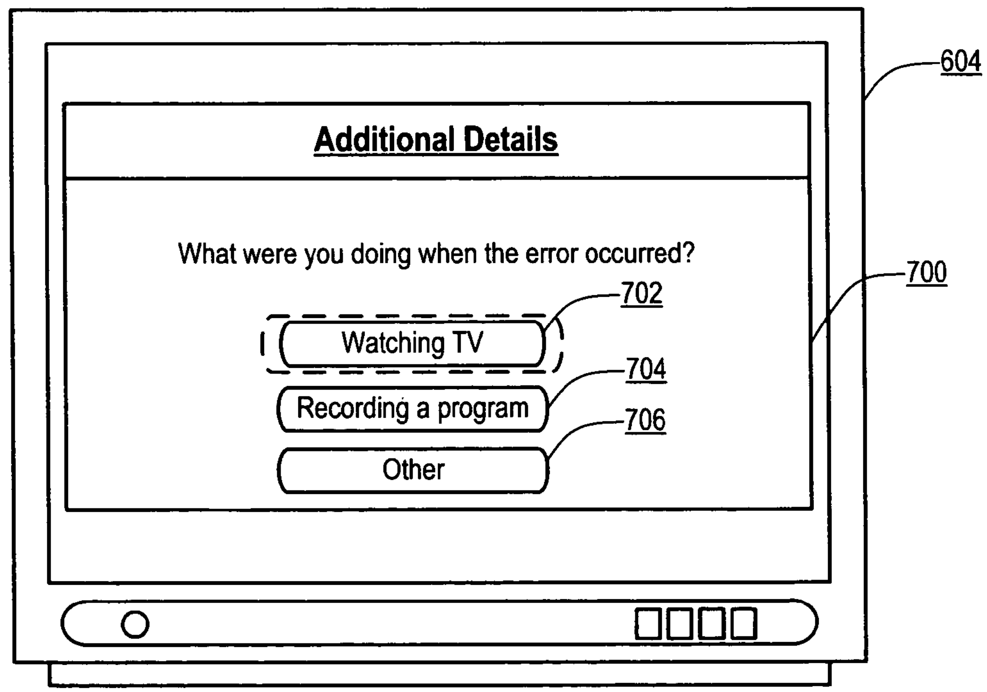
FIG. 7 is an illustration of a second exemplary embodiment of a graphical user interface to report errors in a video distribution network.

FIG. 7 depicts a second illustrative embodiment of a graphical user interface 700 to report errors in a video distribution network. The graphical user interface 700 may include a user interface screen for gathering additional information from a user. The graphical user interface 700 may, for example, include a display window or screen presented on the television 604. A user may interface with the display via a remote control device in communication with the television or a STB to provide input. In a particular embodiment, the additional information user interface screen may be displayed in response to user selection of a send error report option. The additional information screen may allow the user to provide information that may be sent to a remote network device. In a particular illustrative embodiment, the information may be useful for troubleshooting or prioritizing the network communication error for repair. Information provided through the additional information user interface screen may include, for example, information regarding the context of the network communication error. For example, of the context may include what the user was doing when the network communication error occurred. In an illustrative embodiment, the additional information user interface screen may include a plurality of selectable options, such as a watching television option 702, a recording a program option 704, an other option 706 or other options or any combination thereof. The user may select one or more of the selectable options to indicate the context of the network communication error. Selection of the other option 706 may cause one or more additional selectable options to be displayed.

Figure 8:
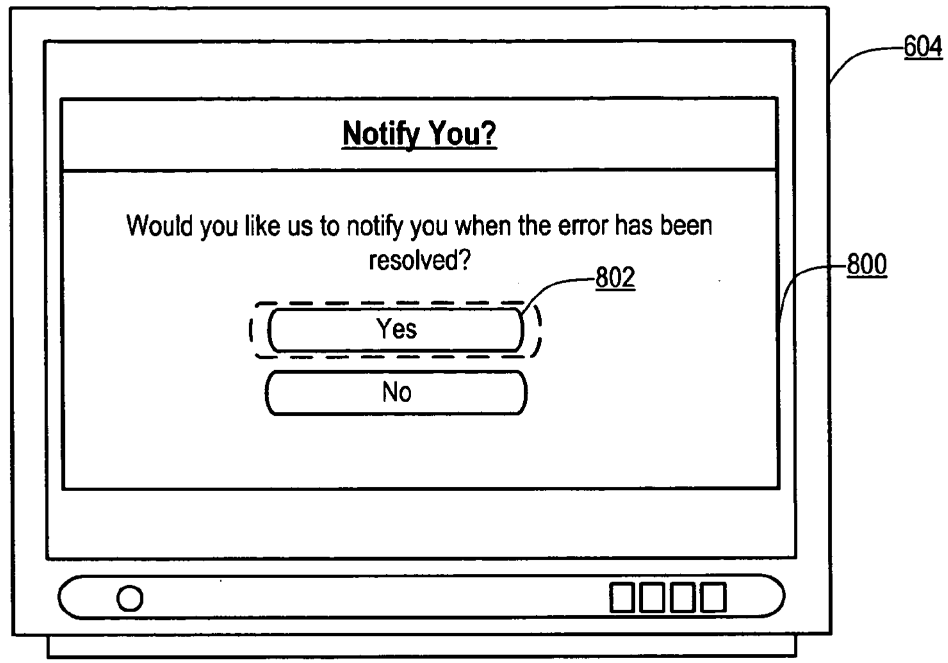
FIG. 8 is an illustration of a third exemplary embodiment of a graphical user interface to report errors in a video distribution network.

FIG. 8 depicts a third illustrative embodiment of a graphical user interface 800 to report errors in a video distribution network. The graphical user interface 800 includes a receive notice of correction option 802. In response to user selection of the receive notice of correction option 802, a message indicating the user's desire to be notified when the network communication error is corrected may be sent to a remote network device. The remote network device may maintain a record of requests for notification of correction of network communication errors, and may send a notification when the network communication error has been corrected.

Figure 9:
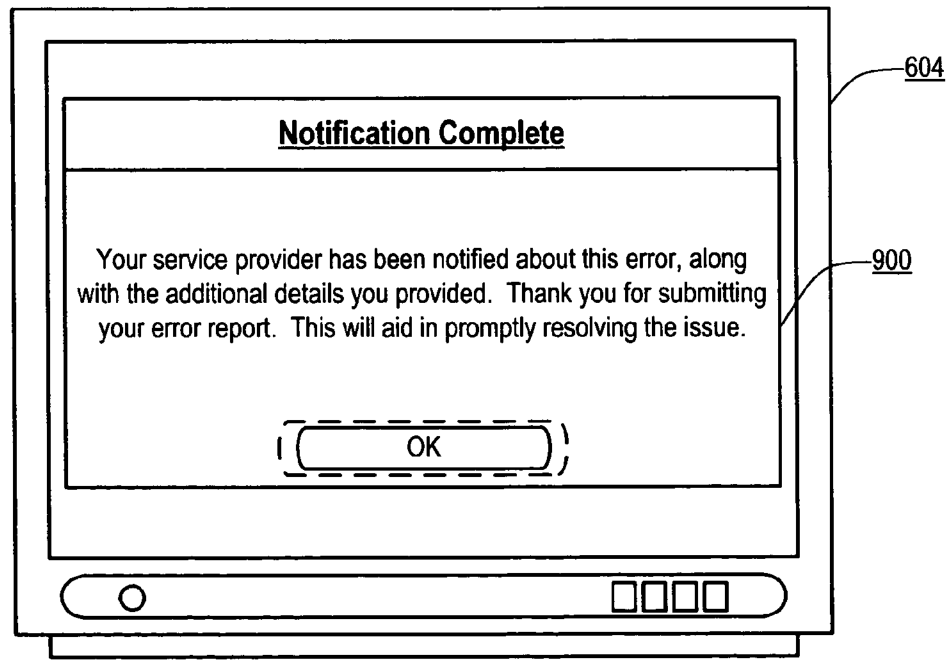
FIG. 9 is an illustration of a fourth exemplary embodiment of a graphical user interface to report errors in a video distribution network.

FIG. 9 depicts a fourth illustrative embodiment of a graphical user interface 900 to report errors in a video distribution network. The graphical user interface 900 includes a confirmation that a service provider, e.g., an IPTV service provider, has been notified of the network communication error. The display 900 also includes a confirmation that the service provider has been provided with additional details provided by the user.

Figure 10:
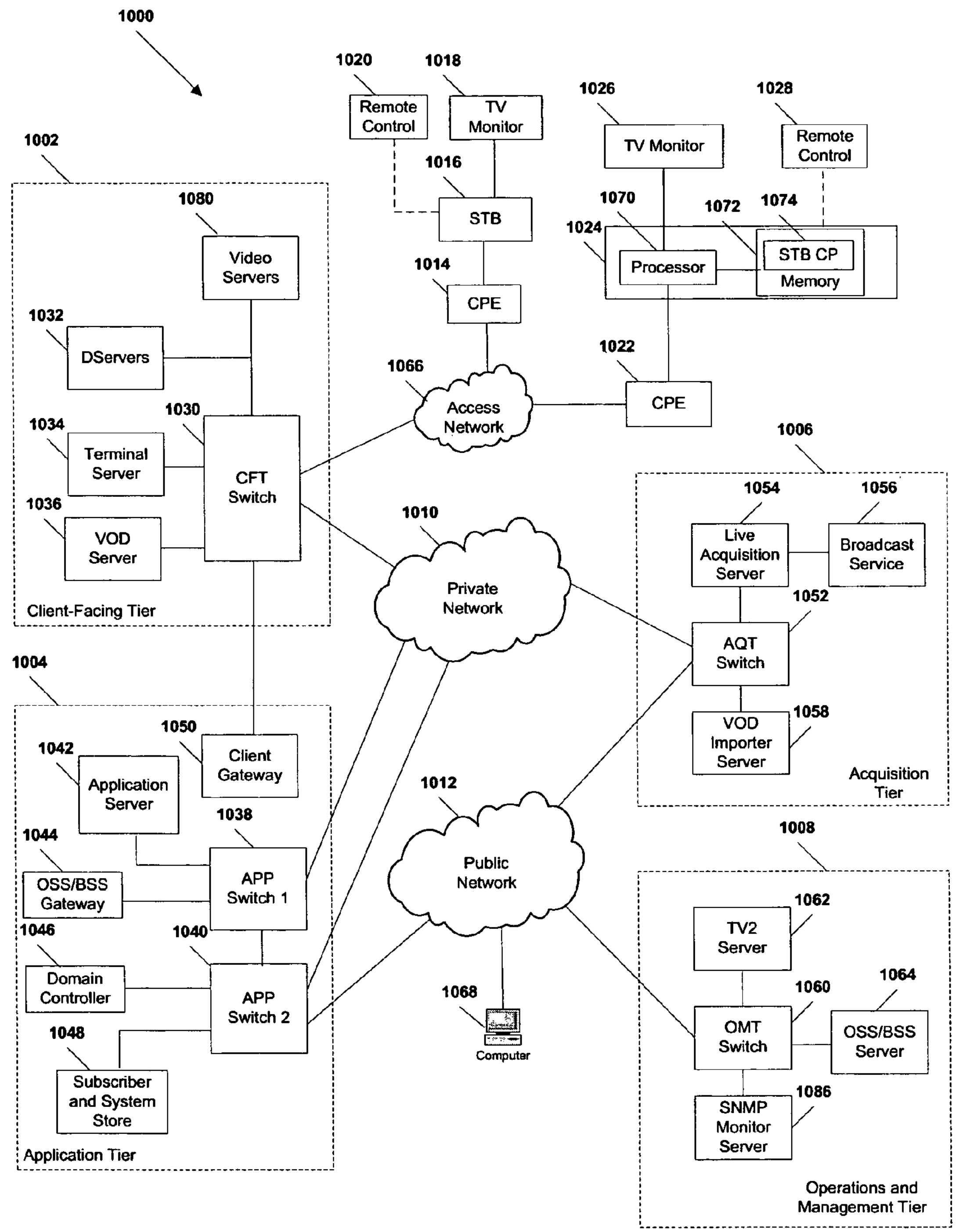
FIG. 10 is a block diagram of an illustrative video distribution system.

Referring to FIG. 10, an illustrative embodiment of an Internet Protocol Television (IPTV) system generally designated 1000. In a particular illustrative embodiment, a video distribution network as discussed above with reference to FIGS. 1-9, may include a system such as IPTV system 1000. As shown, the system 1000 can include a client facing tier 1002, an application tier 1004, an acquisition tier 1006, and an operations and management tier 1008. Each tier 1002, 1004, 1006, 1008 is coupled to a private network 1010; to a public network 1012, such as the Internet; or to both the private network 1010 and the public network 1012. For example, the client-facing tier 1002 can be coupled to the private network 1010. Further, the application tier 1004 can be coupled to the private network 1010 and to the public network 1012. The acquisition tier 1006 can also be coupled to the private network 1010 and to the public network 1012. Additionally, the operations and management tier 1008 can be coupled to the public network 1012.

As illustrated in FIG. 10, the various tiers 1002, 1004, 1006, 1008 communicate with each other via the private network 1010 and the public network 1012. For instance, the client-facing tier 1002 may communicate with the application tier 1004 and the acquisition tier 1006 via the private network 1010. The application tier 1004 may communicate with the acquisition tier 1006 via the private network 1010. Further, the application tier 1004 may communicate with the acquisition tier 1006 and the operations and management tier 1008 via the public network 1012. Moreover, the acquisition tier 1006 may communicate with the operations and management tier 1008 via the public network 1012. In a particular embodiment, elements of the application tier 1004, including, but not limited to, a client gateway 1050, may communicate directly with the client-facing tier 1002.

The client-facing tier 1002 may communicate with user equipment via an access network 1066, such as an Internet Protocol Television (IPTV) access network. In an illustrative embodiment, customer premises equipment (CPE) 1014, 1022 can be coupled to a local switch, router, or other device of the access network 1066. The client-facing tier 1002 may communicate with a first representative set-top box device 1016 via the first CPE 1014 and with a second representative set-top box device 1024 via the second CPE 1022. In a particular embodiment, the first representative set-top box device 1016 and the first CPE 1014 may be located at a first customer premise, and the second representative set-top box device 1024 and the second CPE 1022 may be located at a second customer premise. In another particular embodiment, the first representative set-top box device 1016 and the second representative set-top box device 1024 may be located at a single customer premise, both coupled to one of the CPE 1014, 1022. The CPE 1014, 1022 may include routers, local area network devices, modems, such as digital subscriber line (DSL) modems, any other suitable devices for facilitating communication between a set-top box device and the access network 1066, or any combination thereof.

In an exemplary embodiment, the client-facing tier 1002 may be coupled to the CPE 1014, 1022 via fiber optic cables. In another exemplary embodiment, the CPE 1014, 1022 may be digital subscriber line (DSL) modems that are coupled to one or more network nodes via twisted pairs, and the client-facing tier 1002 may be coupled to the network nodes via fiber-optic cables. Each set-top box device 1016, 1024 may process data received via the access network 1066, via an IPTV software platform, such as Microsoft® TV IPTV Edition.

The first set-top box device 1016 may be coupled to a first external display device, such as a first television monitor 1018, and the second set-top box device 1024 may be coupled to a second external display device, such as a second television monitor 1026. Moreover, the first set-top box device 1016 may communicate with a first remote control 1020, and the second set-top box device 1024 may communicate with a second remote control 1028. The set-top box devices 1016, 1024 may include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 1016, 1024 can receive data, video, or any combination thereof, from the client-facing tier 1002 via the access network 1066 and render or display the data, video, or any combination thereof, at the display device 1018, 1026 to which it is coupled. In an illustrative embodiment, the set-top box devices 1016, 1024 can include tuners that receive and decode television programming signals or packet streams for transmission to the display devices 1018, 1026. Further, the set-top box devices 1016, 1024 can include a STB processor 1070 and a STB memory device 1072 that is accessible to the STB processor 1070. In one embodiment, a computer program, such as the STB computer program 1074, can be embedded within the STB memory device 1072.

In an illustrative embodiment, the STB computer program 1074 may include instructions that enable the set-top box devices 1024 to send a menu of network communication error reporting functions to the display device 1026. For example, the set-top box devices 1024 may present a user with an error reporting interface in response to detecting a network communication error. The error reporting interface may include a menu of stored messages and notifications that the user may select or execute by issuing a command from the remote control device 1028 to the set-top box devices 1024. The STB computer program 1074 may also include instructions to receive a report of a network communication error, or a report of correction of a network communication error. In response to receiving a report of correction of a network communication error, the set-top box device 1024 may to transmit a stored notification message or the received notification to the display device 1026.

In an illustrative embodiment, the STB computer program 1074 may also include instructions which enable the set-top box device 1024 to communicate a network communication error report or an indication of user selection of a report network communication error report option from the set-top box device 1024 to a remote network device of the IPTV network, such as SNMP monitor server 1066.

In an illustrative embodiment, the client-facing tier 1002 can include a client-facing tier (CFT) switch 1030 that manages communication between the client-facing tier 1002 and the access network 1066 and between the client-facing tier 1002 and the private network 1010. As illustrated, the CFT switch 1030 is coupled to one or more data servers, such as D-servers 1032, that store, format, encode, replicate, or otherwise manipulate or prepare video content for communication from the client-facing tier 1002 to the set-top box devices 1016, 1024. The CFT switch 1030 can also be coupled to a terminal server 1034 that provides terminal devices with a connection point to the private network 1010. In a particular embodiment, the CFT switch 1030 can be coupled to a video-on-demand (VOD) server 1036 that stores or provides VOD content imported by the IPTV system 1000. Further, the CFT switch 1030 is coupled to one or more video servers 1080 that receive video content and transmit the content to the set-top boxes 1016, 1024 via the access network 1066.

In an illustrative embodiment, the client-facing tier 1002 can communicate with a large number of set-top boxes, such as the representative set-top boxes 1016, 1024 over a wide geographic area, such as a metropolitan area, a viewing area, a statewide area, a regional area, a nationwide area or any other suitable geographic area, market area, or subscriber or customer group that can be supported by networking the client-facing tier 1002 to numerous set-top box devices. In a particular embodiment, the CFT switch 1030, or any portion thereof, can include a multicast router or switch that communicates with multiple set-top box devices via a multicast-enabled network.

As illustrated in FIG. 10, the application tier 1004 can communicate with both the private network 1010 and the public network 1012. The application tier 1004 can include a first application tier (APP) switch 1038 and a second APP switch 1040. In a particular embodiment, the first APP switch 1038 can be coupled to the second APP switch 1040. The first APP switch 1038 can be coupled to an application server 1042 and to an OSS/BSS gateway 1044. In a particular embodiment, the application server 1042 can provide applications to the set-top box devices 1016, 1024 via the access network 1066, which enable the set-top box devices 1016, 1024 to provide functions, such as interactive program guides, video gaming, display, messaging, processing of VOD material and other IPTV content, etc. In an illustrative embodiment, the application server 1042 can provide location information to the set-top box devices 1016, 1024. In a particular embodiment, the OSS/BSS gateway 1044 includes operation systems and support (OSS) data, as well as billing systems and support (BSS) data. In one embodiment, the OSS/BSS gateway 1044 can provide or restrict access to an OSS/BSS server 1064 that stores operations and billing systems data.

The second APP switch 1040 can be coupled to a domain controller 1046 that provides Internet access, for example, to users at their computers 1068 via the public network 1012. For example, the domain controller 1046 can provide remote Internet access to IPTV account information, e-mail, personalized Internet services, messaging services or other online services via the public network 1012. In addition, the second APP switch 1040 can be coupled to a subscriber and system store 1048 that includes account information, such as account information that is associated with users who access the IPTV system 1000 via the private network 1010 or the public network 1012. In an illustrative embodiment, the subscriber and system store 1048 can store subscriber or customer data and create subscriber or customer profiles that are associated with IP addresses, stock-keeping unit (SKU) numbers, other identifiers, or any combination thereof, of corresponding set-top box devices 1016, 1024. In another illustrative embodiment, the subscriber and system store can store data associated with capabilities of set-top box devices associated with particular customers.

In a particular embodiment, the application tier 1004 can include a client gateway 1050 that communicates data directly to the client-facing tier 1002. In this embodiment, the client gateway 1050 can be coupled directly to the CFT switch 1030. The client gateway 1050 can provide user access to the private network 1010 and the tiers coupled thereto. In an illustrative embodiment, the set-top box devices 1016, 1024 can access the IPTV system 1000 via the access network 1066, using information received from the client gateway 1050. User devices can access the client gateway 1050 via the access network 1066, and the client gateway 1050 can allow such devices to access the private network 1010 once the devices are authenticated or verified. Similarly, the client gateway 1050 can prevent unauthorized devices, such as hacker computers or stolen set-top box devices from accessing the private network 1010, by denying access to these devices beyond the access network 1066.

For example, when the first representative set-top box device 1016 accesses the client-facing tier 1002 via the access network 1066, the client gateway 1050 can verify subscriber information by communicating with the subscriber and system store 1048 via the private network 1010. Further, the client gateway 1050 can verify billing information and status by communicating with the OSS/BSS gateway 1044 via the private network 1010. In one embodiment, the OSS/BSS gateway 1044 can transmit a query via the public network 1012 to the OSS/BSS server 1064. After the client gateway 1050 confirms subscriber and/or billing information, the client gateway 1050 can allow the set-top box device 1016 to access IPTV content and VOD content at the client-facing tier 1002. If the client gateway 1050 cannot verify subscriber information for the set-top box device 1016, e.g., because it is connected to an unauthorized twisted pair, the client gateway 1050 can block transmissions to and from the set-top box device 1016 beyond the access network 1066.

As indicated in FIG. 10, the acquisition tier 1006 includes an acquisition tier (AQT) switch 1052 that communicates with the private network 1010. The AQT switch 1052 can also communicate with the operations and management tier 1008 via the public network 1012. In a particular embodiment, the AQT switch 1052 can be coupled to a live acquisition server 1054 that receives or acquires television content, movie content, advertisement content, other video content, or any combination thereof, from a broadcast service 1056, such as a satellite acquisition system or satellite head-end office. In a particular embodiment, the live acquisition server 1054 can transmit content to the AQT switch 1052, and the AQT switch 1052 can transmit the content to the CFT switch 1030 via the private network 1010.

In an illustrative embodiment, content can be transmitted to the D-servers 1032, where it can be encoded, formatted, stored, replicated, or otherwise manipulated and prepared for communication from the video server(s) 1080 to the set-top box devices 1016, 1024. The CFT switch 1030 can receive content from the video server(s) 1080 and communicate the content to the CPE 1014, 1022 via the access network 1066. The set-top box devices 1016, 1024 can receive the content via the CPE 1014, 1022, and can transmit the content to the television monitors 1018, 1026. In an illustrative embodiment, video or audio portions of the content can be streamed to the set-top box devices 1016, 1024.

Further, the AQT switch 1052 can be coupled to a video-on-demand importer server 1058 that receives and stores television or movie content received at the acquisition tier 1006 and communicates the stored content to the VOD server 1036 at the client-facing tier 1002 via the private network 1010. Additionally, at the acquisition tier 1006, the video-on-demand (VOD) importer server 1058 can receive content from one or more VOD sources outside the IPTV system 1000, such as movie studios and programmers of non-live content. The VOD importer server 1058 can transmit the VOD content to the AQT switch 1052, and the AQT switch 1052, in turn, can communicate the material to the CFT switch 1030 via the private network 1010. The VOD content can be stored at one or more servers, such as the VOD server 1036.

When users issue requests for VOD content via the set-top box devices 1016, 1024, the requests can be transmitted over the access network 1066 to the VOD server 1036, via the CFT switch 1030. Upon receiving such requests, the VOD server 1036 can retrieve the requested VOD content and transmit the content to the set-top box devices 1016, 1024 across the access network 1066, via the CFT switch 1030. The set-top box devices 1016, 1024 can transmit the VOD content to the television monitors 1018, 1026. In an illustrative embodiment, video or audio portions of VOD content can be streamed to the set-top box devices 1016, 1024.

FIG. 10 further illustrates that the operations and management tier 1008 can include an operations and management tier (OMT) switch 1060 that conducts communication between the operations and management tier 1008 and the public network 1012. In the embodiment illustrated by FIG. 10, the OMT switch 1060 is coupled to a TV2 server 1062. Additionally, the OMT switch 1060 can be coupled to an OSS/BSS server 1064 and to a simple network management protocol (SNMP) monitor 1086 that monitors network devices within or coupled to the IPTV system 1000. In a particular embodiment, the OMT switch 1060 can communicate with the AQT switch 1052 via the public network 1012.

In an illustrative embodiment, the live acquisition server 1054 can transmit content to the AQT switch 1052, and the AQT switch 1052, in turn, can transmit the content to the OMT switch 1060 via the public network 1012. In this embodiment, the OMT switch 1060 can transmit the content to the TV2 server 1062 for display to users accessing the user interface at the TV2 server 1062. For example, a user can access the TV2 server 1062 using a personal computer 1068 coupled to the public network 1012.

In conjunction with the configuration of structure described herein, the system and method disclosed provide error reporting in a video distribution network. In a particular embodiment, a video device detects a communication error. The video device presents a send error report option to a user via a video display. If the user selects the send error report option, the video device receives the send error report selection, and performs at least one action in response to receiving the selection.

Figure 11:
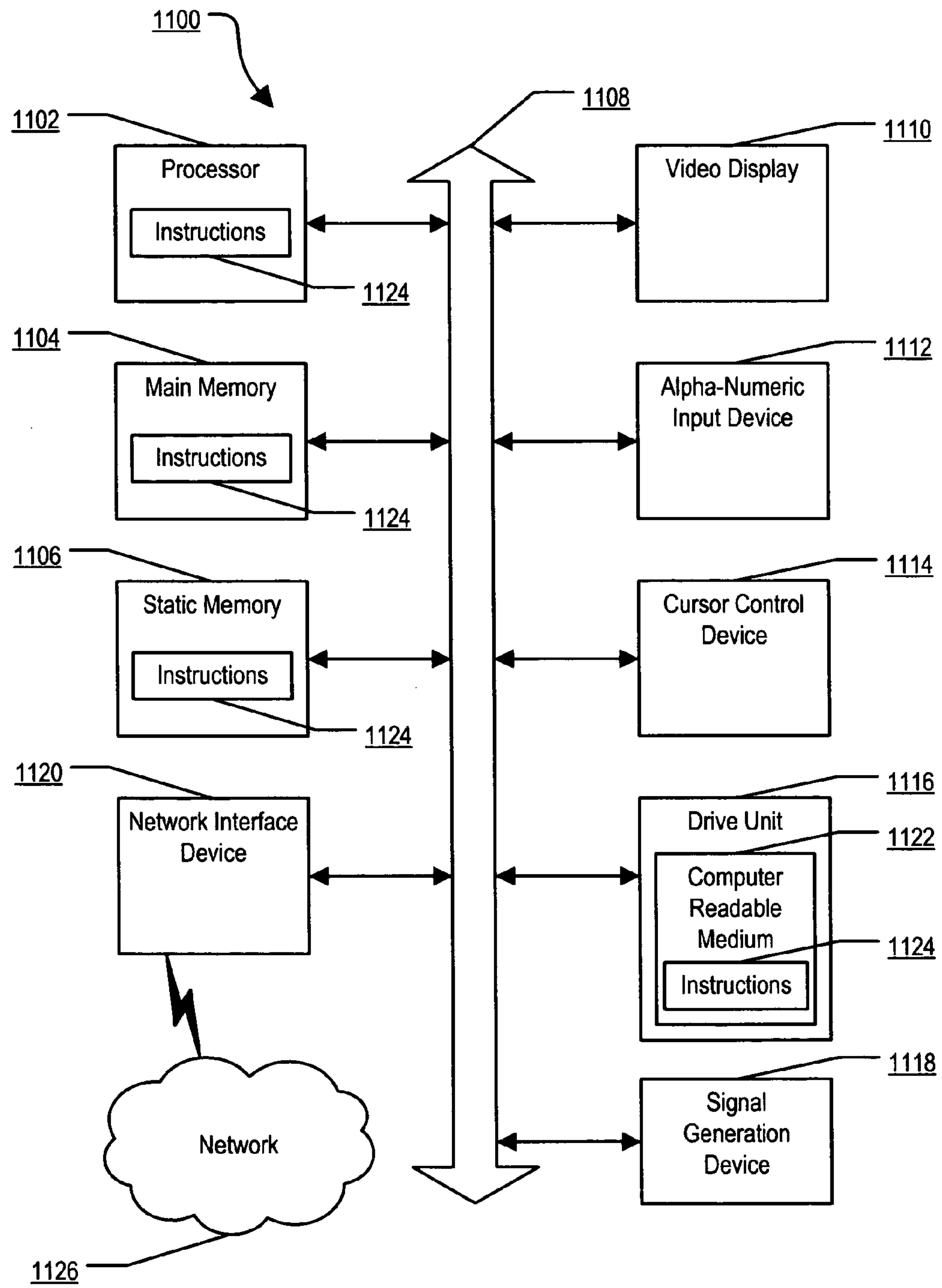
FIG. 11 is a block diagram of an illustrative general computer system.

Referring to FIG. 11, an illustrative embodiment of a general computer system is shown and is designated 1100. The computer system 1100 can include a set of instructions that can be executed to cause the computer system 1100 to perform any one or more of the methods or computer based functions disclosed herein. The computer system 1100 may operate as a standalone device or may be connected, e.g., using a network, to other computer systems or peripheral devices, such as a STB, or network server, as illustrated in FIGS. 1, 2, and 10.

In a networked deployment, the computer system may operate in the capacity of a server or as a client user computer in a server-client user network environment, or as a peer computer system in a peer-to-peer (or distributed) network environment. The computer system 1100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1100 can be implemented using electronic devices that provide voice, video or data communication. Further, while a single computer system 1100 is illustrated, the term "system" shall also be taken to include any collection of systems or sub-systems that individually or jointly execute a set, or multiple sets, of instructions to perform one or more computer functions.

As illustrated in FIG. 11, the computer system 1100 may include a processor 1102, e.g., a central processing unit (CPU), a graphics processing unit (GPU), or both. Moreover, the computer system 1100 can include a main memory 1104 and a static memory 1106, that can communicate with each other via a bus 1108. As shown, the computer system 1100 may further include a video display unit 1110, such as a liquid crystal display (LCD), an organic light emitting diode (OLED), a flat panel display, a solid state display, or a cathode ray tube (CRT). Additionally, the computer system 1100 may include an input device 1112, such as a keyboard, and a cursor control device 1114, such as a mouse. The computer system 1100 can also include a disk drive unit 1116, a signal generation device 1118, such as a speaker or remote control, and a network interface device 1120.

In a particular embodiment, as depicted in FIG. 11, the disk drive unit 1116 may include a computer-readable medium 1122 in which one or more sets of instructions 1124, e.g. software, can be embedded. Further, the instructions 1124 may embody one or more of the methods or logic as described herein. In a particular embodiment, the instructions 1124 may reside completely, or at least partially, within the main memory 1104, the static memory 1106, and/or within the processor 1102 during execution by the computer system 1100. The main memory 1104 and the processor 1102 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1124 or receives and executes instructions 1124 responsive to a propagated signal, so that a device connected to a network 1126 can communicate voice, video or data over the network 1126. Further, the instructions 1124 may be transmitted or received over the network 1126 via the network interface device 1120.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of error reporting in a video distribution network, the method comprising:

determining that a network communication error occurred in an internet protocol television network while distributing video content to a set top box device;

sending an error reporting interface to a video display device associated with the set top box device, wherein the error reporting interface includes selectable additional information options comprising a watching television option and a recording a program option;

receiving, via the error reporting interface, a selection of one of the additional information options;

prioritizing the network communication error for repair based at least in part on a number of user reports of the network communication error, a number of automatically generated reports of the network communication error, and the selected additional information option, wherein the user reports and the automatically generated reports are given different weights when prioritizing the network communication error;

sending priority information associated with the network communication error for display via the error reporting interface;

after receiving a receive notice of correction selection option via the error reporting interface, sending a notice of correction to the set top box device when the network communication error has been corrected; and instructing a content server to resume distribution of the video content to the set top box device.

2. The method of claim 1, further comprising sending the receive notice of correction selection option to the video display device via the error reporting interface.

3. The method of claim 1, wherein the network communication error comprises a failure of a download of the video content to the set top box device.

4. The method of claim 3, wherein determining that the network communication error has occurred comprises receiving a notice that the set top box device has ceased a requested download.

5. The method of claim 1, wherein the error reporting interface includes an error report window, and wherein the method further comprises closing the error report window.

6. The method of claim 1, further comprising sending an error report to an error tracking server of the internet protocol television network.

7. The method of claim 1, wherein the network communication error comprises a failure of at least one device of the internet protocol television network.

8. The method of claim 1, further comprising sending an error report to a remote network device.

9. A non-transitory computer-readable medium tangibly embodying instructions that when executed by a content server cause the content server to:

determine that a network communication error occurred in an internet protocol television network while sending video content to a set top box device;

receive one or more user reports of the network communication error;

receive a plurality of selections of additional information options from a plurality of users, wherein each selected additional information option indicates an activity of a corresponding user when the network communication error occurred, and wherein the selections of additional information options include at least one watching television option and at least one recording a program option;

receive one or more automatically generated reports of the network communication error;

prioritize the network communication error for repair based at least in part on a number of the user reports of the network communication error, a number of the automatically generated reports of the network communication error, and the selections of additional information options, wherein the user reports and the automatically generated reports are given different weights when prioritizing the network communication error;

receive a receive notice of correction selection at the content server from the set top box device;

send a notice of correction from the content server to the set top box device when the network communication error has been corrected; and resume sending the video content from the content server to the set top box device.

10. The non-transitory computer-readable medium of claim 9, further comprising instructions that when executed by the content server cause the content server to:

automatically generate a network communication error report; and automatically send the network communication error report after determining that the network communication error has occurred.

11. A method of error reporting in a video distribution network, the method comprising:

receiving one or more automatically generated reports of a first network communication error occurring in an internet protocol television network while distributing video content to a plurality of set top box devices;

receiving a plurality of user reports of the first network communication error, at least one of the user reports including a selection of an additional information option received from a user, wherein the selected additional information option indicates an activity of the user when the first network communication error occurred, and wherein the selected additional information option includes at least one of a watching television option and a recording a program option;

receiving one or more automatically generated reports of a second network communication error;

receiving one or more user reports of the second network communication error;

determining a repair priority associated with the first network communication error based on a number of the user reports of the first network communication error, a number of the automatically generated reports of the first network communication error, and the selected additional information option associated with the first network communication error, wherein the user reports of the first network communication error and the automatically generated reports of the first network communication error are given different weights when determining the repair priority associated with the first network communication error;

determining a repair priority associated with the second network communication error based on a number of user reports of the second network communication error, a number of automatically generated reports of the second network communication error, and a selected additional information option associated with the second network communication error, wherein the user reports of the second network communication error and the automatically generated reports of the second network communication error are given different weights when determining the repair priority associated with the second network communication error;

prioritizing the first network communication error and the second network communication error for repair based at least in part on the repair priority associated with the first network communication error and the repair priority associated with the second network communication error; and instructing a content server to resume distribution of the video content to the plurality of set top box devices.

12. The method of claim 11, wherein the first network communication error is assigned a higher priority for repair than the second network communication error in response to receiving more user reports of the first network communication error than user reports of the second network communication error.

13. An error tracking server, comprising:

a memory to store:

user reports associated with a plurality of network communication errors, at least one of the user reports including a selection of an additional information option received from a user, wherein the selected additional information option indicates an activity of the user when a network communication error occurred, and wherein the selected additional information option comprises at least one of a watching television option and a recording a program option; and reports associated with the plurality of network communication errors that are automatically generated by one or more set top box devices when at least one of the one or more set top box devices is unable to receive video content that is distributed to the one or more set top box devices via an internet protocol television network; and a processor to:

prioritize each network communication error of the plurality of network communication errors for repair based at least in part on a number of user reports of a particular network communication error, a number of automatically generated reports of the particular network communication error, and the selected additional information option, wherein the user reports and the automatically generated reports are given different weights when prioritizing the particular network communication error;

send a notice of correction to the one or more set top box devices when the particular network communication error has been corrected; and instruct a content server to resume distribution of the video content to the one or more set top box devices.

14. The error tracking server of claim 13, wherein a network communication error with a greatest number of total error reports is assigned a highest priority for repair.

* * * * *